INVENTORS
James T. Malone and
Donald K. Whirlow.

United States Patent Office 3,564,912
Patented Feb. 23, 1971

3,564,912
FLUID FLOW MEASUREMENT SYSTEM
James T. Malone, Arnold, Md., and Donald K. Whirlow, Murrysville, Pa., assignors to Westinghouse Electric Corporation, Pittsburgh, Pa., a corporation of Pennsylvania
Filed Oct. 28, 1968, Ser. No. 771,130
Int. Cl. G01p 5/00
U.S. Cl. 73—194
4 Claims

ABSTRACT OF THE DISCLOSURE

Four velocity measurements are made of a fluid flowing in a pipe. The velocity measurements are made by upstream and downstream transducers projecting acoustic energy towards one another along an acoustic path. With four measurements the acoustic paths lie in respective planes parallel to one another and at a specified distance from the edge or from the center of the pipe. The velocity indications obtained are processed in a digital processor and are multiplied by a predetermined weighting factor. The specified locations of the planes, and the predetermined weighting factors are in accordance with a well known mathematical relationship utilized in the numerical solution of integrals, and known as the Gaussian Quadrature formula or technique. Greater or fewer than four paths may be utilized and as a variation the weighting factors and positioning designations may be made in accordance with two other well known mathematical techniques known as the Chebycheff (spelled various ways e.g. Chebyshev) or Lobatto technique respectively.

BACKGROUND OF THE INVENTION

Field of the invention

The invention in general relates to fluid flow measurements, and particularly to a system for accurately computing volumetric flow rates, and related values, of a fluid, utilizing acoustic measuring techniques.

Description of the prior art

One method of measuring volumetric flow rates in closed conveyances utilizes a Venturi meter which measures pressure differentials within the conveyance. Use of the Venturi meter requires a long distance of straight pipe so that fluid flow is fully developed, a situation which in practice is not always encountered.

Another method for closed conveyances or open channels include the introduction of some identifiable material into the flow with the measurement of the time required for the material to travel a known distance. The correct time interval determination is often inexact, and sensing equipment obstructs the flow.

In large open channels a "Midsection Method" is utilized whereby the channel is divided into many vertical sections and water velocity measurements are taken at the two tenths and eight tenths depth points in the center of each section. The average of these two velocities for each section is multiplied by the area of the section and the results totaled to determine the discharge. This method requires a great length of time, in the order of hours, and is also susceptible to localized flow disturbances and errors in velocity measurements.

One method practiced in open channels utilizes acoustic measurements wherein upstream and downstream transducers travel up the walls of the channel and periodically project acoustic energy toward one another to obtain velocity indicative measurements during the course of travel. Movement of the transducers along a track means, however, is required.

It is a primary object of the present invention to provide a system which computes volumetric flow rates accurately and without the objections attendant with the prior art types of measurements.

It is a further object to provide a system for computing volumetric flow rates acoustically with a minimal number of acoustic transducers for obtaining a relatively high accuracy.

SUMMARY OF THE INVENTION

Volumetric flow rate across a reference plane of a fluid flowing in a conveyance is derived by apparatus which obtains values indicative of the product of the length of a plurality of lines in the plane multiplied by respective average fluid velocity in a direction perpendicular to the respective lines and perpendicular to the reference plane. The values are summed and modified by certain constants including weighting factors associated with each line position. The weighting factors and line positions relative to a reference are chosen in accordance with the abscissas and weight factors for Gaussian integration. Alternative methods include the abscissas and weight factors for Chebycheff and Lobatto integration. Preferably the product indications are obtained acoustically by utilization of a plurality of accurately positioned transducer pairs which project acoustic energy toward one another and digital circuitry which obtains an indication of the difference in travel time of acoustic energy propagated between transducer pairs.

DESCRIPTION OF THE PREFERRED EMBODIMENT

Although various velocity measuring systems may be utilized, the present invention preferably incorporates acoustic velocity measuring means. In one well-known acoustic method an upstream and downstream transducer arrangement is utilized wherein the transducers project acoustic energy towards one another in periodic transmission cycles. The difference in arrival times of the acoustic energy at the upstream and downstream transducer provides an indication of fluid velocity. This is a well known measuring technique based upon the fact that the travel time of the acoustic energy traveling upstream is $$T_u = \frac{L}{C-V}$$

and the travel time of the acoustic energy traveling downstream is $$T_d = \frac{L}{C+V}$$

where L is the distance of the acoustic path between the upstream and downstream transducers, C is the speed of sound in the fluid and V is the fluid velocity along the path L. The difference in transit time $\Delta T$ therefore may be expressed as $$T_u - T_d = \Delta T = \frac{2LV}{C^2 - V^2}$$

Since $C^2$ is much larger than $V^2$ the equation reduces to:

$$\Delta T = \frac{2LV}{C^2} \quad (1)$$

Thus by obtaining an indication of $\Delta T$, and with a known L and a known C the velocity V may be determined. Once the velocity is determined the volumetric flow rate Q across a plane of reference theoretically may be determined by multiplying the velocity by the area of the fluid in the plane of reference. The problem arises however that the single velocity measurement is not in actuality representative of the fluid velocity over the entire area due to the complex nature of fluid flow in a conveyance. The present invention takes a minimal number of velocity measurements at specified locations in the conveyance and provides a highly accurate indication of volumetric flow rate Q.

Figure 1:
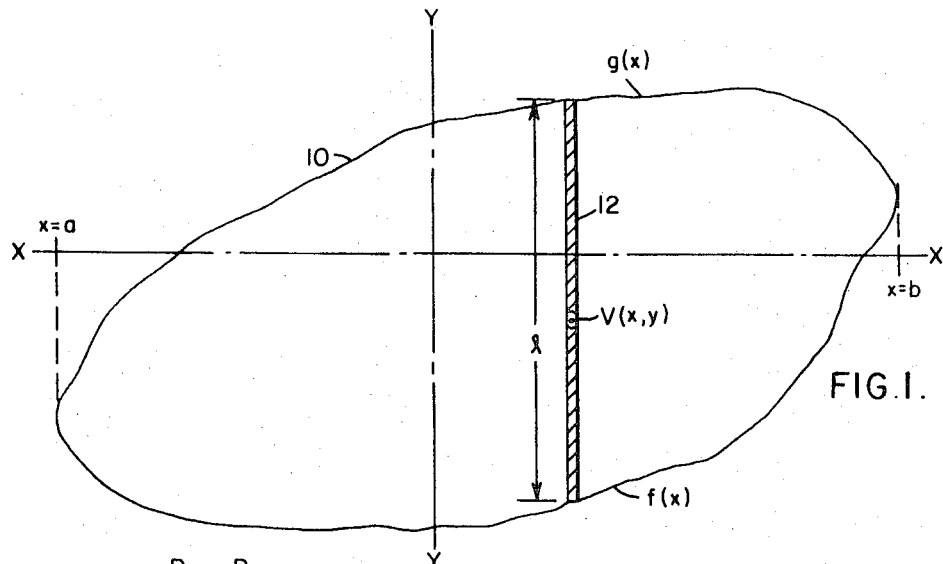
FIG. 1 is a curve illustrating an integration process and helpful in an understanding of certain mathematical relationships herein.

In FIG. 1 the curve 10 represents a fluid conveyance and is bounded by the functions $g(x)$ and $f(x)$ between first and second limits of $x=a$ and $x=b$. $v(x, y)$ is the velocity at point $x, y$ in a direction toward (or away from) the viewer. The volumetric flow rate Q can be defined by the area integral:

$$Q = \int_a^b \int_{f(x)}^{g(x)} v(x, y) \, dy \, dx \quad (2)$$

Performing the first integral yields the following relationship:

$$\int_{f(x)}^{g(x)} v(x, y) \, dy = \bar{v}(x)[g(x) - f(x)] \quad (3)$$

which in effect, is the integration of the velocity along the strip 12 between $f(x)$ and $g(x)$ where the length of the strip 12 is $g(x) - f(x)$ and may be expressed generally as $l(x)$ and the average velocity along the strip 12 is expressed as $\bar{v}(x)$.

Substituting back in Equation 2:

$$Q = \int_a^b \bar{V}(x) L(x) \, dx \quad (4)$$

The integral of Equation 4 is in a form solvable by a mathematical method of numerical quadrature and in a preferred embodiment Gauss' method for numerical quadrature is utilized. In the Gaussian method, Equation 4 may be expressed as:

$$Q = \frac{b-a}{2} \cdot \sum_{k=1}^{n} W_k [\bar{V}(x_k) L(x_k)] \quad (5)$$

In Equation 5 $b$ and $a$ are limits such as illustrated in FIG. 1, $k$ is a particular number and in the practicing of the present invention will be a particular path number along which a measurement is made, $n$ is a whole number and will be equal to the number of paths to be utilized, $W_k$ is a weighting factor and $x_k$ is a particular defined path position, for path $k$. $W_k$ and $x_k$ are chosen in accordance with the well known Gaussian method for numerical quadrature. Such method is well known to those skilled in the art of mathematics and is described in detail in various publications such as a booklet published by the U.S. Department of Commerce, National Bureau of Standards, and entitled Abscissa's and Weights for Gaussian Quadrature, pages 1 to 9. The booklet is NBS Monograph 98 and has a Library of Congress catalogue card No. 66–62096. The method is also described in mathematics textbooks such as The Mathematics of Physics and Chemistry, H. Nargenan and G. M. Murphy, D. Van Nostrand Co., Inc. Princeton, N.J., March 1962, pages 479–481.

By way of example, to the nearest ten-thousandths, positions $x_k$ and weighting factors $W_k$ for Equation 5 are given in the following Table I for $n$'s ranging from 2 to 6.

TABLE I

| For $n=2$ | | For $n=5$ | |
|---|---|---|---|
| $X_k$ | $W_k$ | $X_k$ | $W_k$ |
| ±0.5773 | 1.0000 | ±0.9061 | 0.2369 |
| For $n=3$ | | ±0.5384 | 0.4786 |
| $X_k$ | $W_k$ | 0.0000 | 0.5688 |
| ±0.7745 | 0.5555 | For $n=6$ | |
| 0.0000 | 0.8888 | $X_k$ | $W_k$ |
| For $n=4$ | | ±0.9324 | 0.1713 |
| $X_k$ | $W_k$ | ±0.6612 | 0.3607 |
| ±0.8611 | 0.3478 | ±0.2386 | 0.4679 |
| ±0.3399 | 0.6521 | | |

The $X_k$ values given in the table are for the normalized range from $-1$ to $+1$. By way of example for four paths ($n=4$) the $X_k$ values computed by the Gaussian method are $+0.8611$ units away from a reference, $+0.3399$ units away from the reference, $-0.3399$ units away from the reference and $-0.8611$ units away from the reference, the reference being the midplane midway between the limits $a$ and $b$. Values obtained at the ±0.8611 positions will be multiplied by a weighting factor $W_k$ equal to 0.3478. Values obtained at the ±0.3399 positions will be multiplied by a weighting factor $W_k$ equal to 0.6521. In the present invention $\bar{V}L$ values are obtained at each designated position $X_k$ and those values are effectively multiplied by the specified weighting factor $W_k$ for that position. The preferred embodiment will be described with respect to four measurements and to this end reference is now made to FIGS. 2, 3 and 4.

Figure 2:
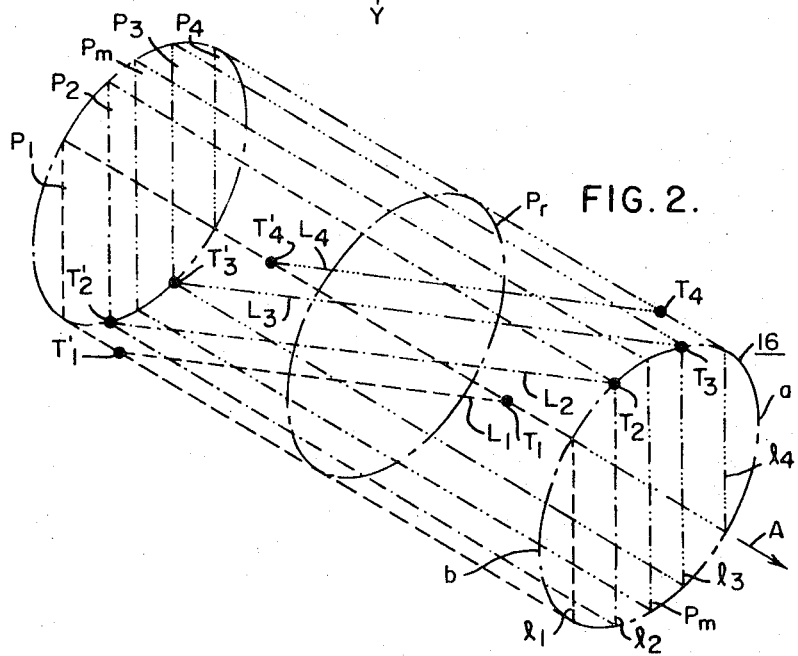
FIG. 2 is an isometric line diagram representing a fluid conveyance and illustrating certain transducer positioning and defining certain terms utilized herein.

FIG. 2 illustrates a section 16 of a fluid conveyance in the form of a circular pipe having a fluid flowing therein in a resultant upstream to downstream direction as indicated by the arrow A which is perpendicular to a reference plane $P_r$.

Velocity measurements are acoustically made along a plurality of paths, four in the present example, by means of four pairs of transducers $T_1$-$T'_1$, $T_2$-$T'_2$, $T_3$-$T'_3$ and $T_4$-$T'_4$ with the primed references indicating upstream transducers and the unprimed references, downstream transducers (the pipe is conveniently shown as having no thickness, and the transducers are shown as points). Each downstream transducer is separated from its upstream transducer by respective distances $L_1$ to $L_4$ the indicated lines $L_1$ to $L_4$ also being identical to the acoustic path between transducer pairs when the transducers are suitably energized. The acoustic paths $L_1$ to $L_4$ preferably lie in a common plane and each path traverses the fluid at an angle $\theta$ with respect to the fluid flow A. Each of the acoustic paths $L_1$ to $L_4$ additionally lies in respective planes $P_1$ to $P_4$ parallel to one another and spaced at predetermined distances from a reference position.

Looking into the pipe from the end, the acoustic paths $L_1$ to $L_4$ will appear as parallel lines $l_1$ to $l_4$, the lengths of the respective acoustic paths $L_1$ to $L_4$ projected on the reference plane $P_r$, and terminating in the boundaries of the conveyance 16.

Figure 3:
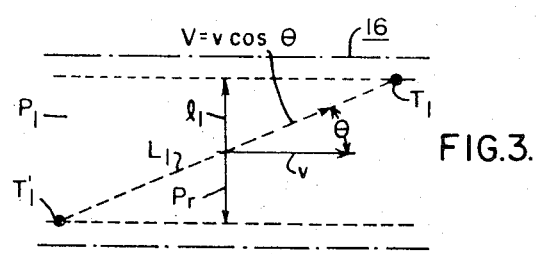
FIG. 3 is an elevational view of FIG. 2 illustrating certain angular relationships.

Certain relationships, including the relationships between L and $l$ may be seen in FIG. 3. The acoustic path $L_1$ lying between transducers $T_1$ and $T'_1$ lies in plane $P_1$ and is at an angle $\theta$ with respect to fluid flow, the velocity of which is indicated by the arrow $v$. From geometric considerations, the component of velocity measurable along the acoustic path $L_1$ is $V = v \cos \theta$ and the projection of the acoustic path $L_1$ onto the reference plane $P_r$ is $L_1 \sin \theta$, that is, $l_1 = L_1 \sin \theta$. Similarly the same relationships apply to the remaining components of the planes $P_2$ to $P_4$.

The transducer pairs are positioned such that the planes $P_1$ to $P_4$, and accordingly the lines $l_1$ to $l_4$ are positioned substantially in accordance with the $X_k$ values as previously described.

Figure 4:
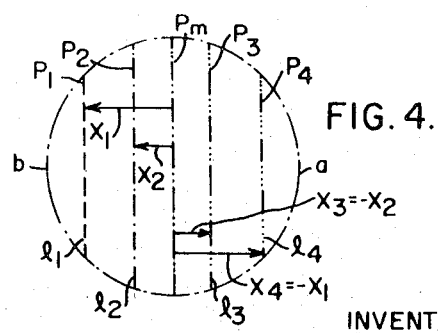
FIG. 4 is a view of FIG. 2 illustrating critical positioning of acoustic paths.

For four paths FIG. 4 illustrates the lines $l_1$ to $l_4$ on the reference plane $P_r$ and positioned at respective distances $X_1$ to $X_4$ from a reference position $P_m$ which is a midplane midway between the first and second limits $a$ and $b$. The positioning is symmetrical about midplane $P_m$ and accordingly $X_3=-X_2$ and $X_4=-X_1$. For a pipe with a diameter of $(b-a)$ feet, the actual location of each path in the pipe would be $$\frac{b-a}{2} X_k$$

For example, with reference to Table I, for a 10 foot diameter pipe and four paths, two paths would be positioned at substantially 4.3055 feet on either side of the midplane $P_m$ and the other two paths at substantially 1.6995 feet on either side of the midplane $P_m$.

From the relationships in FIG. 3, $V = v \cos \theta$ and $l_1 = L_1 \sin \theta$, Equation 1 may be generally expressed as:

$$\Delta T = \frac{2vl \cot \theta}{C^2} \quad (6)$$

The $v$ term in Equation 6 is equivalent to the $v$ in FIG. 3 which is, by virtue of the measurement made along the acoustic path $L_1$, an average velocity in plane $P_1$. Since the $v$ term is an average it will be represented by $\bar{v}$ and Equation 7 may be arranged as follows:

$$\bar{v}l = \frac{\Delta T C^2 \tan \theta}{2} \quad (7)$$

The apparatus of the present invention obtains values proportional to $\bar{v}l$ as in Equation 7, for each acoustic path by a measurement of the $\Delta T$ associated with the difference in transit times of acoustic energy propagated between transducer pairs. The operation may best be demonstrated by reference to FIGS. 5 and 6.

Figure 5:
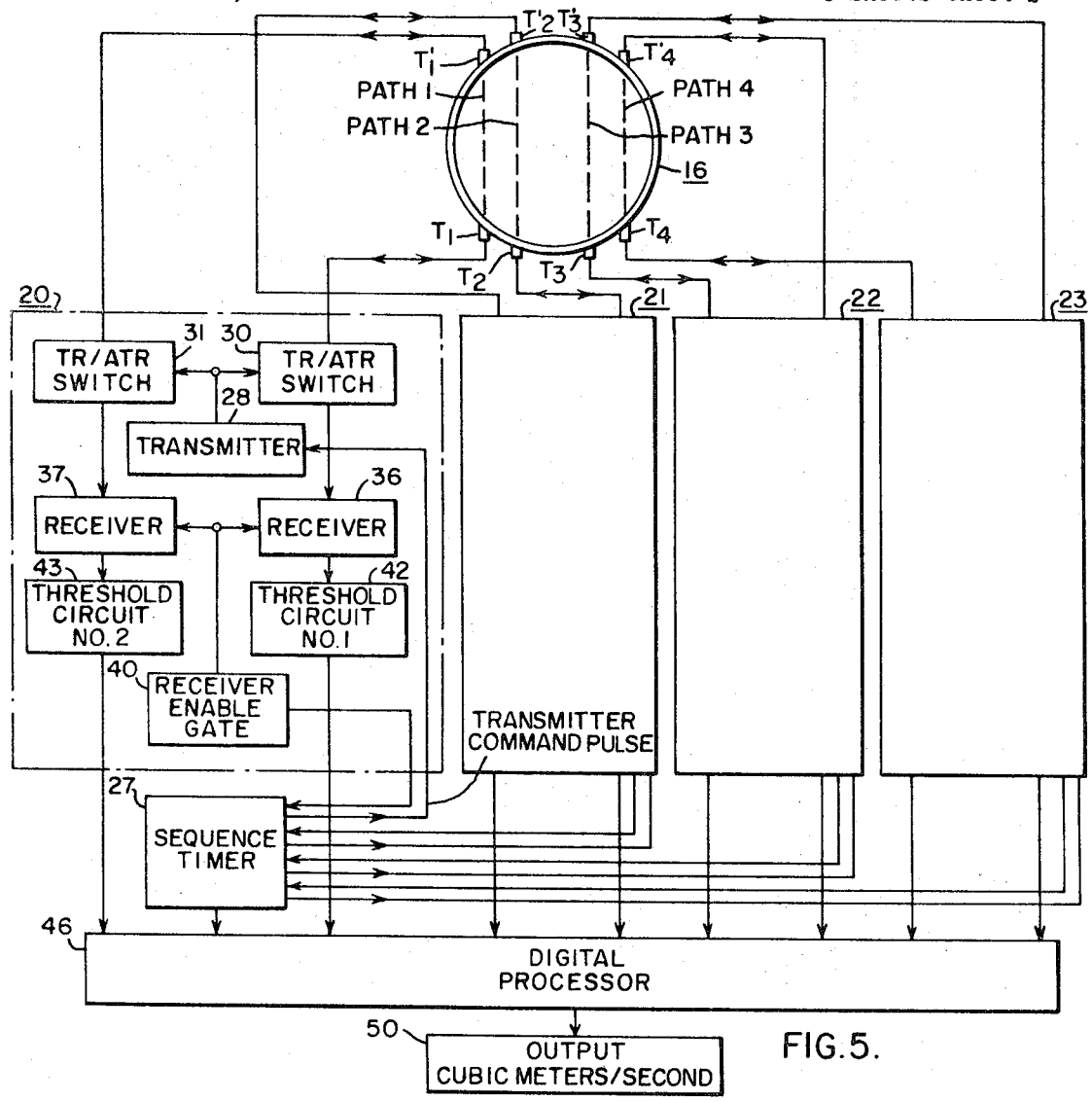
FIG. 5 is a block diagram illustrating circuitry which may be utilized to perform certain calculations.
Figure 7:
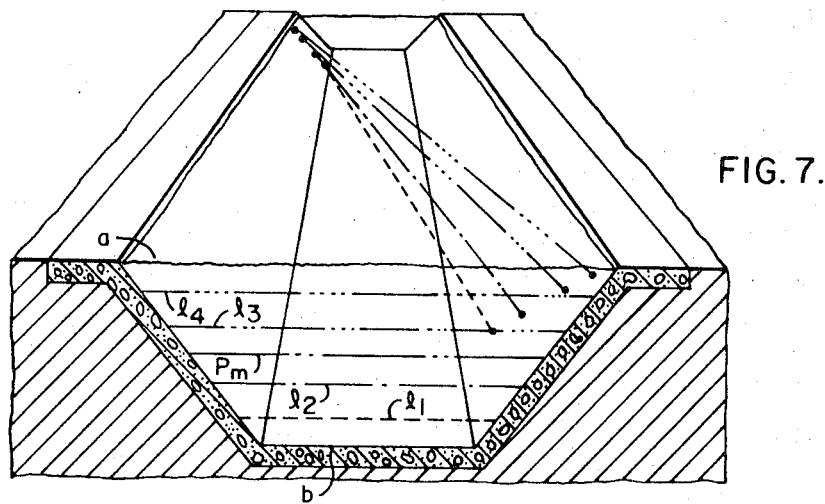
FIG. 7 is a view of another type of fluid conveyance in which volumetric flow rates may be measured.

In FIG. 5 there is illustrated the section of pipe 16 and transducer pairs $T_1$, $T'_1$, to $T_4$, $T'_4$. In FIG. 5 the housings containing the transducer active elements are mounted on the outside and extend into the walls of the pipe 16 and the active element is communicative with the fluid at the interior wall of the pipe so as not to protrude into the fluid.

Transmitter and receiver means are provided for respectively energizing the transducers so that they may propagate acoustic energy toward one another through the fluid during periodic transmission cycles, and thereafter for sensing the output signals provided by the transducer as a result of the impingement of the acoustic energy. The transmit-receive electronics are illustrated in block 20 for tranducer pair $T_1$, $T'_1$. The transmit-receive electronics 21, 22 and 23 for respective transducer pairs $T_2$, $T'_2$, to $T_4$, $T'_4$, are identical to block 20. Upon proper command from a program controller such as sequence timer 27, transmitter 28 will supply energy to transducers $T_1$ and $T'_1$ through transmit/anti-transmit (TR/ATR) switches 30 and 31 respectively. When transducer $T_1$ receives the acoustic energy propagated by transducer $T'_1$ it will produce an output signal which is sent to receiver 36 via TR/ATR switch 30. Similarly, the acoustic energy transmitted by transducer $T_1$ causes transducer $T'_1$ to provide an output signal to receiver 37 via TR/ATR switch 31. When the receiver enable gate 40 receives the proper command from the sequence timer 27 it will provide an enabling signal to receivers 36 and 37 to pass the received signal to respective threshold circuits 42 and 43, the output signals of which will be squarewave pulses in a time sequence indicative of the difference in travel time of the acoustic energy propagated between the transducer pair $T_1$ and $T'_1$. The threshold circuits may be of the well-known type which will provide a digital output signal when the input from the receiver exceeds a predetermined threshold value. The difference in time occurrence of the output signals of threshold circuits 42 and 43 is indicative of $\Delta T$. The digital processor 46 is operable to receive the outputs provided by threshold circuits 42 and 43, in addition to the outputs provided by the threshold circuits in blocks 21 to 23 for paths 2, 3 and 4 respectively to obtain for each transducer pair values proportional to $\bar{v}l$ as heretofore explained. The digital processor 46 also includes circuit means for, in any convenient order, multiplying the values obtained by respective weighting factors, summing the results obtained, multiplying or dividing by certain proportionality constants, to provide an output signal to a display device 50 for providing an indication of volumetric flow rates or other related readings such as total flow. That is, knowing the flow rate e.g. cubic feet/sec., total flow, cubic feet, may be obtained over a desired period of time.

The digital processor 46 may be implemented by one skilled in the art once knowing the function to be performed. One example of a digital processor which may be utilized herein is illustrated in somewhat more detail in FIG. 6 to which reference is now made.

Basically, the digital processor 46 includes a $\Delta T$ counter which counts up the output pulses from a variable frequency oscillator (VFO) for a time period commencing with the output from a first threshold circuit, such as 42, and terminating with the output of a second threshold circuit, such as 43. The count in the $\Delta T$ counter will then be indicative of $\Delta T$ and proportional to $\bar{v}l$ as in Equation 7. In operation many $\bar{v}l$ values are obtained for each path and the values then multiplied by the specified weighting factor for that path.

In the present example four paths are utilized and the $\bar{v}l$ values obtained from paths 1 and 4 which are equally displaced from the midplane will be multiplied by the same weighting factor $W_1$. Similarly the $\bar{v}l$ values, obtained for paths 2 and 3, equally displaced from the midplane will be multiplied by the same weighting factor $W_2$.

Figure 6:
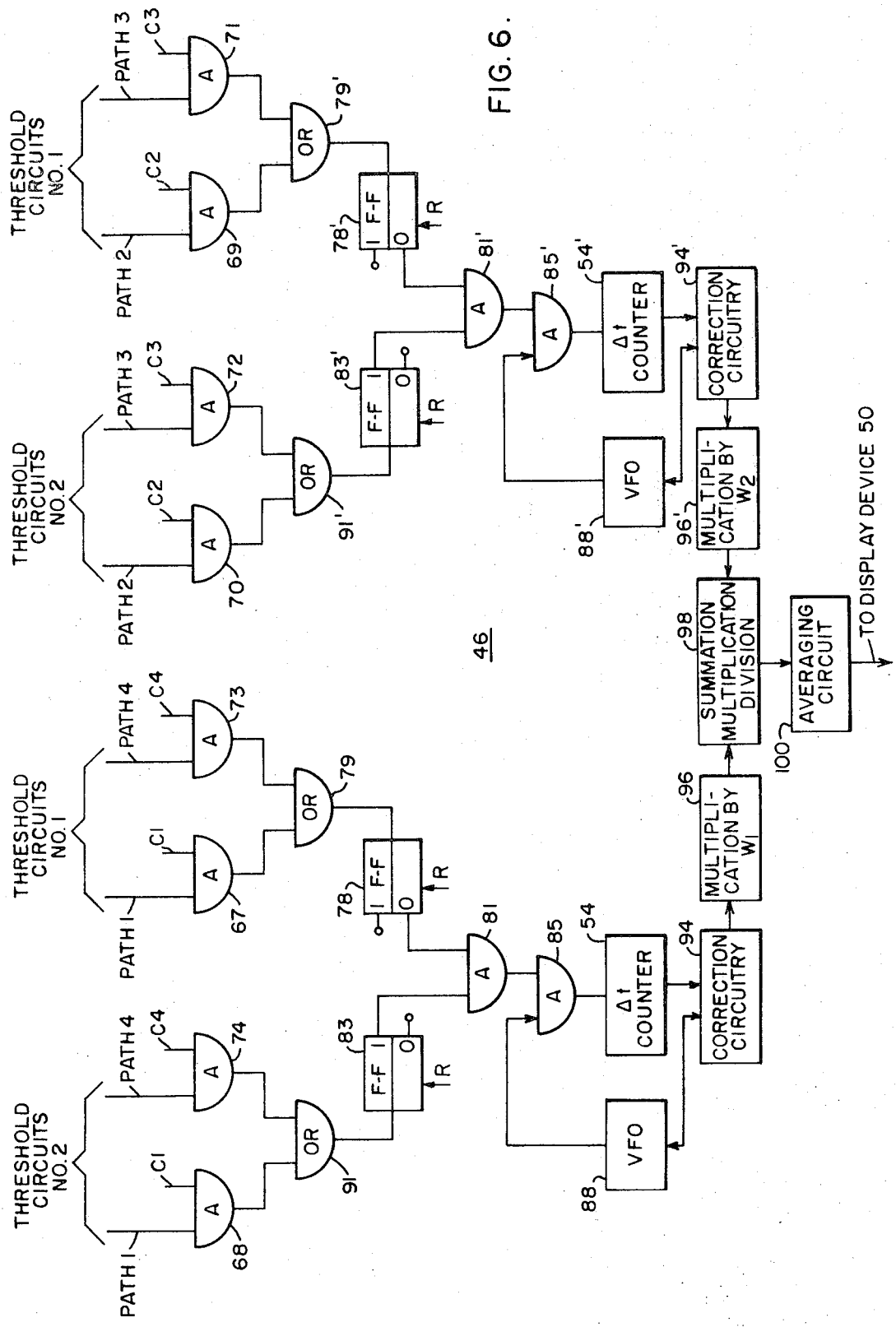
FIG. 6 is a block diagram illustrating a portion of the circuitry of FIG. 5 in more detail.

In view of the symmetry of paths (1, and 4, and 2 and 3) only one $\Delta T$ counter need be provided for paths 1 and 4, and one $\Delta T$ counter for paths 2 and 3, although it is to be understood that one $\Delta T$ counter could be provided for each path or, with proper time sharing circuitry, one $\Delta T$ counter for all four paths. In FIG. 6, $\Delta T$ counter 54 is provided for paths 1 and 4, and $\Delta T$ counter 54' is provided for paths 2 and 3. The output signals from the threshold circuits for each path (FIG. 5) are respectively received by a plurality of AND gates 67 to 74 each of which additionally receives an enabling control signal C1, C2, C3 or C4 which may be provided by the sequence timer 27 of FIG. 5, and indicative of which path is being examined.

By way of example suppose that path 1 is the first to be examined. Control signal C1 will be provided to AND gates 67 and 68 and when threshold circuit 42 provides its output signal, AND gate 67 will provide an output signal to flip-flop 78 by way of OR gate 79. The output of flip-flop 78 is connected to AND gate 81 which additionally receives the output from a second flip-flop 83. The flip-flop 83 normally provides a one output signal and flip-flop 78 normally provides a zero output signal. When OR gate 79 passes the output from AND gate 67, flip-flop 78 will be placed into its opposite state to thereby provide a one output signal to AND gate 81 which in turn enables AND gate 85. With AND gate 85 enabled it will pass the output pulses from VFO 88 to the $\Delta T$ counter 54 which will continue to count up the VFO output until threshold circuit 43 provides its output signal. When an output signal is provided by the threshold circuit 43 it is received by AND gate 68 which, since the C1 signal is additionally present, will provide a one output signal through OR gate 91 to change the output state of flip-flop 83 to a zero thus causing AND gate 81 to terminate its enabling output signal to AND gate 85. The count in the $\Delta T$ counter 54 therefore is indicative of $\Delta T$, the difference in transit time of acoustic energy propagated between transducers $T_1$ and $T'_1$. Flip-flop 78 and 83 may then be reset to their original states as illustrated by the provision of a reset signal R provided by, for example, the sequence timer 27.

With the removal of control signal C1 and the application of control signal C4, ΔT counter 54 may be utilized to obtain a ΔT indication for path 4 in a manner as previously described with respect to path 1. The ΔT counter 54 will then have a summation of the ΔT counts for both paths 1 and 4.

The circuit components having primed reference numerals operate in a similar manner to their unprimed counterparts for obtaining ΔT values for paths 2 and 3 by the provision of control signals C2, and thereafter C3, to AND gates 69 to 72.

The C term in Equation 7 represents the speed of sound in the fluid under measurement. In actual practice this term is not a constant but varies with the mineral content and temperature of the fluid under measurement and to maintain high accuracy many flowmeter systems include circuitry for correcting the varying speed of sound. Accordingly, correction circuitry 94 is provided and operates after the ΔT counter 54 has stopped counting up the VFO output, to modify the ΔT count in accordance with variations in the speed of sound C. One type of correction circuitry which may be employed is further described in U.S. Pat. 3,402,606. A correction circuitry 94' is similarly provided for the ΔT counter 54'.

The process being carried out by the circuitry of FIG. 6 is a numerical manipulation in accordance with Equation 5 which includes a summation process. The output of the correction circuitry 94 is a count indicative of the $\bar{v}l$ values for paths 1 and 4 summed together and the output of correction circuitry 94' is indicative of the $\bar{v}l$ values for paths 2 and 3 summed together. The $\bar{v}l$ values are multiplied by their associated weighting factors $W_1$ and $W_2$ in multiplication circuits 96 and 96' respectively. After multiplication by respective weighting factors, the values are provided to circuit 98 which performs a summation of all $\bar{v}l$ values and which circuit may additionally perform various multiplications and divisions by constants as required. For example, in Equation 5 the summation is multiplied by a factor related to the dimensions of the fluid conveyance. This multiplication by $$\frac{b-a}{2}$$

as well as multiplication by any proportionality factors, tangent $\theta$ and division by 2 (Equation 7) may be performed in circuit 98 the output of which is Q.

Each time that a summation is made in accordance with Equation 5 the output Q may be transferred to an averaging circuit 100 which averages out the result over a predetermined time period, for example an, averaging may take place once every minute. The output of the averaging circuit 100 is then transferred to the display device 50 of FIG. 5.

The digital processor 46 therefore performs the multiplication and summation as indicated in Equation 5. Obviously the mathematical manipulations may be performed in sequences other than illustrated in FIG. 6. Additionally the control signals C1 to C4 may be provided in any desirable sequence. For example, paths 1 and 4 may be sampled many times by the provision in time sequence of control signals C1, C4, C1, C4 . . . etc. and thereafter paths 2 and 3 may be examined by the same repetitive sequence of control signals C2 and C3. By this latter method the ΔT counters 54 and 54' will have a summation of many $\bar{v}l$ valves which may be properly scaled at some point in the mathematical manipulation.

The first alternative of the positioning of the transducer pairs and weighting factors may be chosen in accordance with Chebycheff's method of numerical integration which is given by the general formula:

$$\left(\frac{b-a}{2}\right)\left(\frac{2}{n}\right)\sum_{k=1}^{n}[\bar{v}(X_k)l(X_k)] \quad (8)$$

In the Chebycheff method, for the range of −1 to +1, the weighting factor is the same for all paths and is equal to $2/n$, $n$ being the number of paths. The Chebycheff method of numerical integration is a well known technique and is described in various mathematical textbooks such as Numerical Mathematical Analysis, J. B. Scarborough, 2nd ed., The Johns Hopkins Press, 1950. In accordance with the Chebycheff technique, positioning of transducer pairs would be in accordance with the following Table II for $n=2$ to $n=6$.

TABLE II

| For $n=2$ | | For $n=5$ | |
|---|---|---|---|
| $X_k$ | $W_k$ | $X_k$ | $W_k$ |
| ±0.5773 | 1.0000 | 0.0000 | 0.4000 |
| For $n=3$ | | ±0.8324 | 0.4000 |
| $X_k$ | $W_k$ | ±0.3745 | 0.4000 |
| 0.0000 | 0.6666 | For $n=6$ | |
| ±0.7071 | 0.6666 | $X_k$ | $W_k$ |
| For $n=4$ | | ±0.8662 | 0.3333 |
| $X_k$ | $W_k$ | ±0.4225 | 0.3333 |
| ±0.7946 | 0.5000 | ±0.2666 | 0.3333 |
| ±0.1875 | 0.5000 | | |

Since the weighting factor for an $n$ transducer pair system in the Chebycheff technique does not change, only one multiplication by a weighting factor need be performed.

For certain types of fluid conveyances and under certain conditions the Gaussian technique may be modified so as to reduce the number of transducer pairs needed to obtain a volumetric flow rate while still maintaining a relatively high accuracy. This modified technique is in accordance with Lobatto method for numerical integration and it may be utilized where certain values at the limits are known. For the range −1 to +1 Lobatto's weighting and positioning factors are utilized in the Lobatto formula $$W_1[\bar{v}(-1)l(-1)]+\sum_{k=2}^{n-1}W_k[\bar{v}(X_k)l(X_k)] \\ +W_n[\bar{v}(+1)l(+1)]$$

The Lobatto technique is described in various mathematical books such as Numerical Mathematical Analysis. For closed conduit work and under certain flow conditions it is known that the velocity at the walls of the conduit is zero and accordingly the terms:

$$W_1[\bar{v}(-1)l(-1)] \text{ and } W_n[\bar{v}(+1)l(+1)]$$

are equal to zero. Hence, by using the Lobatto technique a volumetric flow rate may be obtained utilizing four transducer pairs with just a little less accuracy than utilizing the Gaussian technique with five transducer pairs. The weighting and positioning factors for the Lobatto technique are given in Table III, for $n=3$ to $n=6$.

TABLE III

| For $n=3$ | | *For $n=5$* | |
|---|---|---|---|
| $X_k$ | $W_k$ | $X_k$ | $W_k$ |
| ±1.0000 | 0.3333 | ±1.0000 | 0.1000 |
| 0.0000 | 1.3333 | ±0.6546 | 0.5444 |
| For $n=4$ | | 0.0000 | 0.7111 |
| $X_k$ | $W_k$ | For $n=6$ | |
| ±1.0000 | 0.1666 | $X_k$ | $W_k$ |
| ±0.4472 | 0.8333 | ±1.0000 | 0.0666 |
| | | ±0.7650 | 0.3784 |
| | | ±0.2852 | 0.5548 |

In FIG. 2 there is illustrated a fluid conveyance in the form of a pipe. The Gaussian technique, as well as the Chebycheff technique may be utilized in general for fluid conveyances of various shapes. For example in FIG. 8 there is shown a fluid conveyance in the form of an open channel. Downstream and upstream transducer pairs are illustrated for a four path system, with each acoustic path lying in a plane at specified positions between limits $a$ and $b$.

Although the present invention has been described with a certain degree of particularity, it should be understood that the present disclosure has been made by way of example and that modifications and variations of the present invention are made possible in the light of the above teachings.

We claim as our invention:

1. Apparatus for measuring volumetric flow rate across a reference plane, of a fluid flowing in a conveyance in an upstream to downstream direction and contained within the conveyance between first and second limits, comprising:
   (a) a plurality of pairs of transducers each transducer pair comprising opposed upstream and downstream transducers separated by a known distance;
   (b) means for energizing each said pair of transducers for propagation of acoustic energy through the fluid toward one another along an acoustic path at an angle with respect to resultant fluid flow direction, said transducers providing output signals upon receipt of said acoustic energy;
   (c) circuit means coupled to said pairs of transducers and responsive to the output signals provided thereby for obtaining values indicative of the difference in transit time of acoustic energy propagated between transducer pairs, said values being proportional to $\bar{v}l$, where $l$ is the length of an acoustic path, for a particular transducer pair, projected on, and defining a line in, the reference plane, and $\bar{v}$ is the average velocity of fluid flow perpendicular to both $l$ and the reference plane;
   (d) means for performing a summation of said values modified by predetermined constants including respective weighting factors $W_k$, where $k$ designates a particular one of said lines;
   (e) said lines being spaced at respective distances $X_k$ from a reference position;
   (f) said weighting factors $W_k$ and distances $X_k$ being chosen in accordance with one of the following methods of numerical quadrature
      (i) Gaussian Method
      (ii) Chebycheff Method
      (iii) Lobatto Method.

2. Apparatus according to claim 1 wherein:
   (a) the acoustic paths lie in respective planes parallel to one another.

3. Apparatus according to claim 2 wherein:
   (a) the acoustic paths additionally lie in a common plane.

4. Apparatus according to claim 1 wherein:
   (a) the conveyance containing the fluid is cylindrical; and
   (b) the transducers are positioned on said conveyance and are communicative with the fluid at the interior wall of said conveyance.

References Cited

UNITED STATES PATENTS

| | | | |
|---|---|---|---|
| 3,402,606 | 9/1968 | Bruha | 73—194 |
| 3,440,876 | 4/1969 | Hayes et al. | 73—194 |

OTHER REFERENCES

H. F. Messias, "Ultrasonics Measures Flow Velocity of Rivers," Electronics, Oct. 13, 1961, pp. 56–59.

CHARLES A. RUEHL, Primary Examiner